March 4, 1941.   H. H. RAPLEY   2,233,850
MEANS FOR ACCURATELY SPACING ARTICLES ON CONVEYERS
Filed Jan. 7, 1939   2 Sheets-Sheet 1

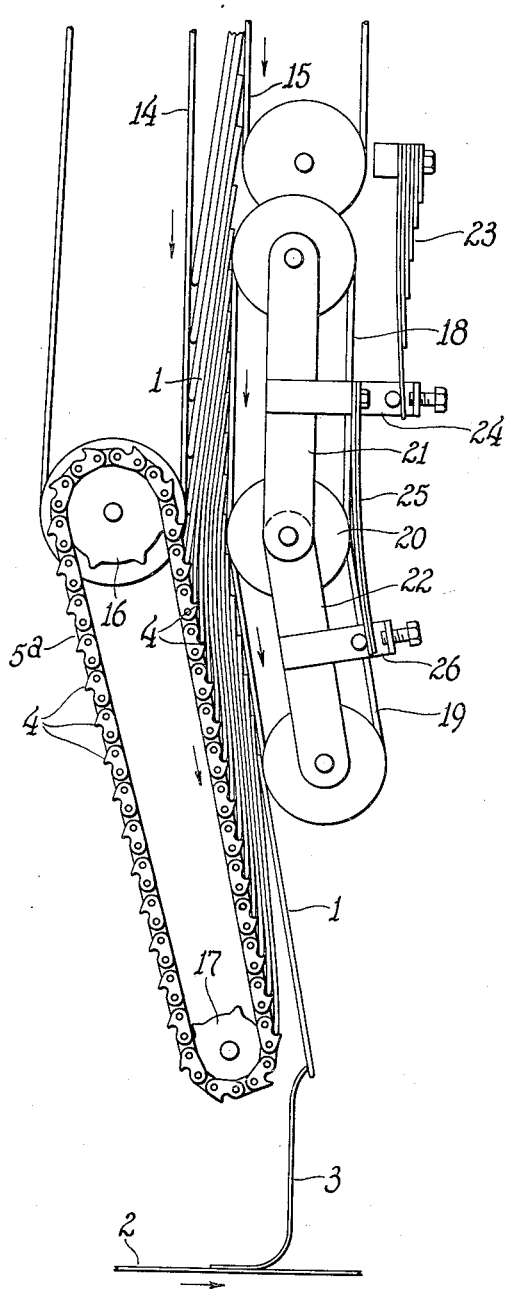

Patented Mar. 4, 1941

2,233,850

UNITED STATES PATENT OFFICE 2,233,850

MEANS FOR ACCURATELY SPACING ARTICLES ON CONVEYERS

Harold Herbert Rapley, Bedford, England, assignor to Cutler-Hammer, Inc., Milwaukee, Wis., a corporation of Delaware Application January 7, 1939, Serial No. 249,685
In Great Britain January 27, 1938

4 Claims. (Cl. 198—34)

This invention relates to means for accurately spacing articles on conveyers. The object of the invention is the provision of improved means of this character whose operation will be more certain than heretofore, and the invention consists broadly in the arrangement that the articles are first arranged on the conveyer at longer intervals than those required, and the intervals are subsequently shortened by the articles catching up with, and being checked by, spaced teeth or the equivalent moving in a substantially straight line beside the conveyers.

In order that the invention may be the more clearly understood, two devices in accordance therewith will now be described, reference being made to the accompanying drawings wherein:

Fig. 2 is a similar view of the other.

Figure 1:
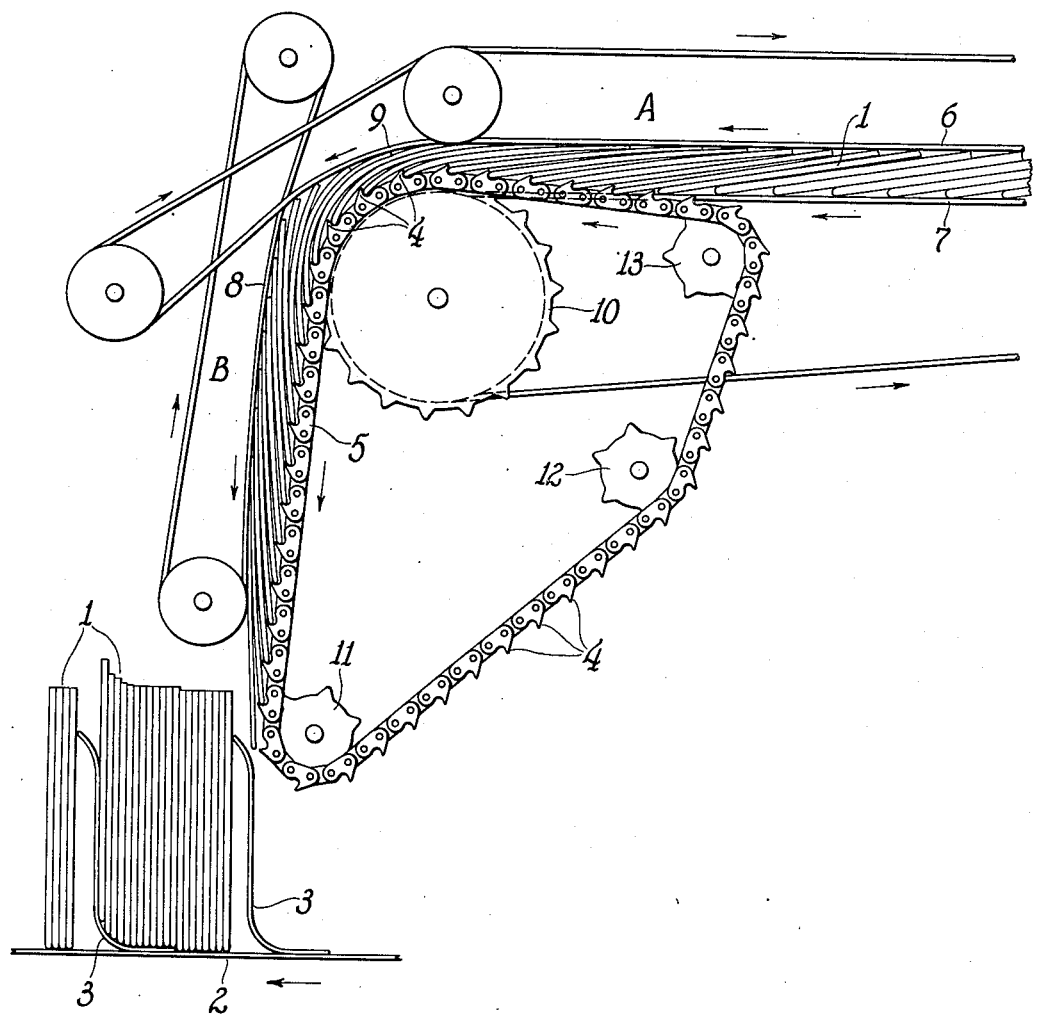
Fig. 1 is a somewhat diagrammatic elevation of one of said devices.

Referring first to Fig. 1, this illustrates a mechanism for delivering newspapers from a printing press in batches. In this arrangement the papers 1 are fed from the press onto an intermediate conveyer in an imbricated relation, that is overlapping one another like the tiles of a roof, and are carried by said intermediate conveyer first horizontally as at A, and then vertically downwards as at B to be delivered in an upright position—that is to say, on edge—onto a horizontal delivery conveyer 2 which has associated upstanding blades 3 for separating the papers into batches.

These blades 3 will separate the papers into batches of the correct number only if the spacing of the papers 1, as they are delivered to the delivery conveyer 2 is uniform and accurate. To obtain such accurate spacing, the intervals between the papers 1 at the point where they are fed onto the intermediate conveyer are greater than those at which they are delivered to the delivery conveyer 2, the shortening of the intervals being effected by the papers catching up with, and being slowed down by, spaced teeth 4 moving in a substantially straight line beside the conveyer. These teeth are preferably formed on endless chains 5 extending alongside the conveyer.

More particularly the papers 1, throughout their horizontal run A, are conveyed between top and bottom endless belting 6 and 7 and as they approach the bend where they turn vertically downwards, they engage the teeth 4 on the endless chains 5 which, from the underside of the conveyer, converge at an acute angle to the track of the papers 1 as the corner is approached. The chains 5 then turn the bend, and, throughout the remainder of the vertical run, form the inner side of the conveyer, the outer side being formed by suitable vertical endless belting 8. Cornering belting 9 is also provided for supporting the papers 1 on the outside as they round the bend.

At the end the endless chains 5 run round sprocket wheels 10 which are concentric with the end pulleys on which the lower horizontal belting 7 runs, and, for the remainder of their path, said endless chains run each on say three more suitably spaced sprocket wheels 11, 12 and 13.

The speed of the endless chains 5 is less than that of the horizontal belting 6 and 7 in the ratio of the spacing of the teeth 4 to the spacing of the papers 1 on said horizontal belting, and the papers as they approach the bend engage successive teeth and are accordingly successively slowed down and have their spacing reduced to that of the teeth, slip taking place between the papers and the horizontal belting 6 and 7. It is to be noted that the spacing of the papers 1 on the horizontal belting 6 and 7 should be less than twice that of the teeth 4 to ensure that the papers shall never miss a tooth.

The outer vertical belting 8 and the cornering belting 9 may be geared to run at the same speed as the endless chains 5 or they may be simply idler belting driven by contact with the papers 1.

The endless chains 5 may suitably be of the bicycle chain type, the teeth 4 being constituted by suitably shaping the side plates of every link or every second link so that, in the direction of the approaching papers, said side plates present upstanding edges against which the papers abut.

It will be seen that once the spacing of the papers 1 has been determined by the teeth 4, it will be maintained correct by the teeth right to the point of delivery on the delivery conveyer.

The intervals between the teeth may suitably be, say, one inch and a quarter.

Referring now to Fig. 2, this also shows a mechanism for delivering newspapers from a printing press in batches; the arrangement is similar to that described with reference to Fig. 1 with the following exceptions:

The newspapers 1 in imbricated relation are conveyed more or less vertically, and not horizontally, as they approach and engage the teeth 4 on the endless chains 5a, and thus they do not have to turn a sharp corner while in engagement with the endless chains and after they have received their correct spacing.

Thus, the papers 1 approaching the endless chains 5a are conveyed between more or less vertical endless belting 14 and 15, and, at one side, the chains 5a form a continuation of the belting 14 running at their upper ends over sprockets 16 coaxial with the lowermost pulleys of the belting 14. The chains 5a, in the present arrangement run over top and bottom sprockets 16 and 17 only. On the other side of the stream of papers 1 is a presser conveyer section consisting of two runs of endless belting 18 and 19 of which the middle set 20 of pulleys, which comprise the lower pulleys for the upper run 18 and the upper pulleys for the lower run 19, are just about opposite the point at which the papers 1 begin to engage the chains 5a.

The two runs 18 and 19 of this presser conveyer section are mounted on respective frames 21 and 22 which are pivoted together. The upper run 18 is biased as a whole towards the stream of papers by means of a fixedly mounted leaf spring 23 bearing against a bracket 24 mounted on said frame 21, and the lower run 19 is biased relatively to the upper run by means of a leaf spring 25 mounted on said bracket 24 and bearing against a similar bracket 26 mounted on the frame 22. Thus it is ensured that the papers 1 will be positively pressed against the chains 5a throughout the region at which they begin to make contact therewith.

Said presser conveyer section is driven solely frictionally by the papers 1 themselves, and thus both runs can adjust their speed to that of the adjacent stream, it being appreciated that the speed of the lower run 19 will be less than that of the upper run 20, as the papers are slowed down by engagement with the teeth 4 on the chains 5a. This presser conveyer section forms a continuation of the lower end of the belting 15 on that side but does not extend so far down as the chains 5a do, falling short to the extent of about three quarters or four fifths the length of a newspaper 1, thus enabling the blades 3 for separating the papers into batches to function more satisfactorily. The upper belting 14 and 15 on both sides, above the chains 5a and the presser conveyer section is positively driven.

Actually the stream of papers 1 above the chains 5a may be inclined to the vertical slightly in one direction, while the stream alongside the chains may be inclined slightly in the other direction, so that the stream may make a slight bend, the chains 5a being at the convex side of the bend.

What I claim and desire to secure by Letters Patent is:

1. The combination with a relatively high speed conveyer section for advancing newspapers in an imbricated and given spaced relation, of a horizontally arranged low speed conveyer section and a vertical conveyer section intermediate the former conveyer sections for delivering the newspapers on edge from said high speed conveyer section to said low speed conveyer section, said last mentioned conveyer section including a chain belt driven at a slower speed than said high speed conveyer section and having projecting parts for successively engaging the leading edges of the newspapers to retard the same and shorten the spacing thereof as the same are discharged from said high speed conveyer section, said last mentioned conveyer section also including means for yieldingly holding the newspapers in engagement with said chain belt.

2. The combination with a relatively high speed conveyer section for advancing newspapers in an imbricated and given spaced relation, of a horizontally arranged low speed conveyer section and a vertically disposed conveyer section intermediate said high speed and low speed conveyer sections for delivering the newspapers vertically and on edge from said high speed conveyer section to said low speed conveyer section, said last mentioned conveyer section being driven at a slower speed than said high speed conveyer section and including a belt having uniformly spaced projections thereon for successively engaging the leading edges of the newspapers to retard the same and shorten the spacing thereof upon delivery to said intermediate conveyer section, said intermediate conveyer section also including means for yieldingly holding the newspapers in engagement with said belt but only until the leading edges of the newspapers approach the delivery end of said belt.

3. The combination with a relatively high speed conveyer section for advancing newspapers in an imbricated and given spaced relation, of an intermediate conveyer section associated with the delivery end of said high speed conveyer section and disposed at an angle thereto, said intermediate conveyer section including a chain belt driven at a slower speed than said high speed conveyer section and having projecting parts for successively engaging the leading edges of the newspapers to retard the newspapers and shorten the spacing thereof as the same are delivered to said intermediate conveyer section, said intermediate conveyer section also including means for yieldingly holding the newspapers in engagement with said chain belt but only until the leading edges of the newspapers approach the delivery end of said chain belt.

4. The combination with a relatively high speed conveyer section for advancing newspapers in an imbricated and given spaced relation, of a horizontally arranged low speed conveyer section for receiving the newspapers from said high speed conveyer section and a conveyer section intermediate said high and low speed conveyer sections for delivering the newspapers vertically and on edge from said high speed conveyer section to said low speed conveyer section, said intermediate conveyer section being arranged at an angle to said high speed conveyer section and including a chain belt driven at a slower speed than said high speed conveyer section and having uniformly spaced projections thereon for successively engaging the leading edges of the newspapers to retard the same and shorten the spacing thereof during delivery to said intermediate conveyer section, and means for yieldingly holding the newspapers in engagement with said chain belt but only until the leading edges of the newspapers approach the delivery end of said chain belt.

HAROLD H. RAPLEY.